(12) United States Patent
Miyazaki

(10) Patent No.: US 11,418,226 B2
(45) Date of Patent: Aug. 16, 2022

(54) RADIO FREQUENCY MODULE AND COMMUNICATION DEVICE

(71) Applicant: Murata Manufacturing Co., Ltd., Nagaokakyo (JP)

(72) Inventor: Daisuke Miyazaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/167,078

(22) Filed: Feb. 4, 2021

(65) Prior Publication Data

US 2021/0258024 A1 Aug. 19, 2021

(30) Foreign Application Priority Data

Feb. 13, 2020 (JP) .............................. JP2020-022816

(51) Int. Cl.
  *H04B 1/04* (2006.01)
  *H04B 1/16* (2006.01)
  *H04B 1/40* (2015.01)
  *H04B 1/00* (2006.01)

(52) U.S. Cl.
  CPC ........... *H04B 1/006* (2013.01); *H04B 1/0067* (2013.01); *H04B 1/0458* (2013.01); *H04B 2001/0408* (2013.01)

(58) Field of Classification Search
  CPC ........ H04B 1/00; H04B 1/006; H04B 1/0067; H04B 1/04; H04B 1/0408; H04B 1/0458; H04B 1/40; H04B 1/44; H04B 2001/0408; H04B 1/0057; H04B 1/06; H04B 1/086; H04B 1/16; H04B 2001/0408
  See application file for complete search history.

(56) References Cited

U.S. PATENT DOCUMENTS

| 6,973,330 | B2 * | 12/2005 | Wieck | H04B 1/3816 455/78 |
| 8,546,980 | B2 * | 10/2013 | Shimamoto | H04B 1/006 307/109 |
| 9,099,979 | B2 * | 8/2015 | Nakamura | H04B 1/44 |
| 10,827,607 | B2 * | 11/2020 | Park | H04M 1/0277 |
| 10,979,088 | B2 * | 4/2021 | Chang | H04B 1/0057 |
| 2010/0273535 | A1 * | 10/2010 | Inamori | H04B 1/006 455/571 |
| 2020/0253040 | A1 * | 8/2020 | Dalmia | H01L 23/66 |

FOREIGN PATENT DOCUMENTS

JP  5215767 B2  6/2013

* cited by examiner

*Primary Examiner* — Quochien B Vuong
(74) *Attorney, Agent, or Firm* — Xsensus LLP

(57) ABSTRACT

A radio frequency (RF) module includes a board including a first principal surface and a second principal surface on opposite sides of the board, a filter including a first terminal and a second terminal, a first circuit, and a second circuit. The filter is disposed on the first principal surface. The first circuit is disposed on the second principal surface. In a plan view of the board, a first footprint of a first line and a second footprint of a second line at least partially overlap in the board. The first line connects the first terminal and the first circuit, and the second line connects the second terminal and the second circuit.

20 Claims, 9 Drawing Sheets

RADIO FREQUENCY MODULE AND COMMUNICATION DEVICE

CROSS REFERENCE TO RELATED APPLICATION

The present application is based on and claims priority to Japanese Patent Application No. 2020-022816, filed on Feb. 13, 2020. The entire contents of which being incorporated herein by reference.

TECHNICAL FIELD

The present disclosure relates to a radio frequency (RF) module and a communication device.

BACKGROUND

In mobile communication apparatuses such as mobile phones, the total number of circuit components included in radio frequency front-end circuits is increasing, particularly with developments in multiband technologies.

Conventionally, circuit components included in a radio frequency front-end circuit are mounted on both sides of the mounting board. Of the two opposite mounting surfaces of a double-sided mounting core substrate, passive chip components are mounted on a first mounting surface on which external terminal electrodes are disposed, whereas active chip components are mounted on a second mounting surface opposite the first mounting surface. With this configuration, it is possible to provide a circuit module which is high in density and small in size as compared to a circuit module in which circuit components are formed on a single-sided mounting board.

Although such a conventional circuit module of the double-sided mounting type enables an increase in density and reduction in size, the distances between the circuit components decrease, with the result that the signal passing properties are likely to deteriorate due to mutual interference between the circuit components.

SUMMARY

A radio frequency (RF) module according to an aspect of the present disclosure includes a board including a first principal surface and a second principal surface on opposite sides of the board, a filter including a first terminal and a second terminal, a first circuit, and a second circuit. The filter is disposed on the first principal surface. The first circuit is disposed on the second principal surface. In a plan view of the board, a first footprint of a first line and a second footprint of a second line at least partially overlap in the board. The first line connects the first terminal and the first circuit, and the second line connects the second terminal and the second circuit.

BRIEF DESCRIPTION OF DRAWINGS

These and other advantages and features will become apparent from the following description thereof taken in conjunction with the accompanying Drawings, by way of non-limiting examples of embodiments disclosed herein.

DETAILED DESCRIPTION OF THE DRAWINGS

Figure 1:
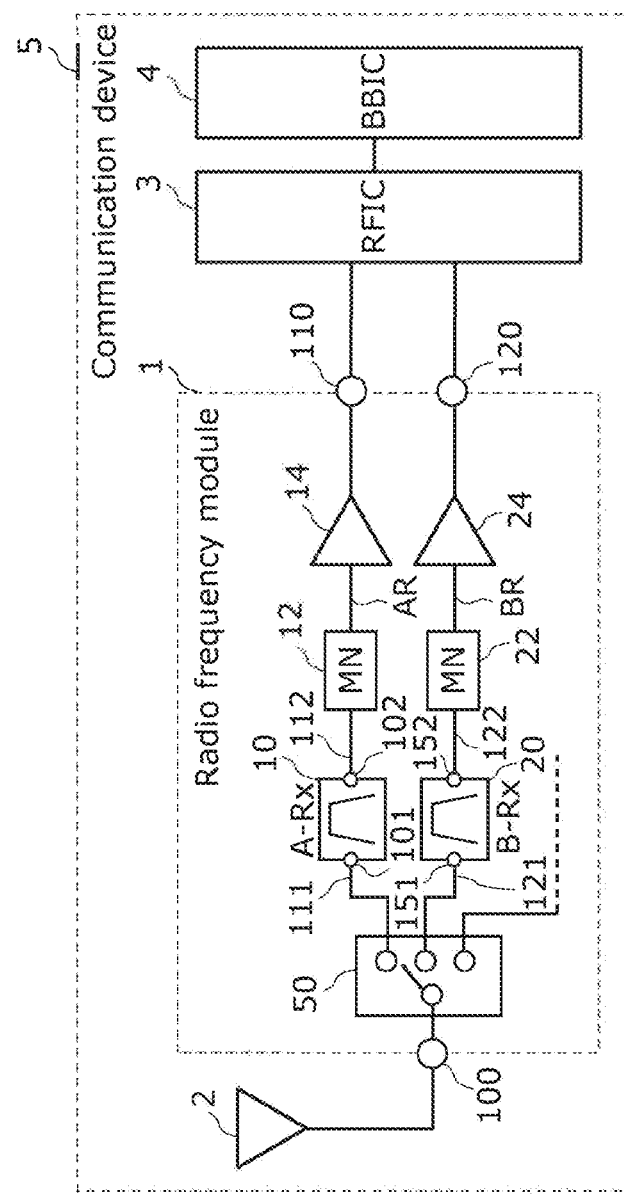
FIG. 1 illustrates a circuit configuration of a radio frequency module and a communication device according to an embodiment.

Hereinafter, embodiments of the present disclosure will be described in detail. Note that the embodiments described below illustrate general or specific examples. The numerical values, shapes, materials, constituent elements, the arrangement and connection of the constituent elements, etc., illustrated in the following embodiments, working examples, and variations are mere examples, and are therefore not intended to limit the present disclosure. Among the constituent elements in the following working examples and variations, constituent elements not recited in the independent claims will be described as optional constituent elements. In addition, the size of the constituent elements and the ratio of the size illustrated in the drawings are not necessarily precise. In the drawings, essentially the same constituent elements share the same reference signs, and redundant descriptions will be omitted or simplified.

In the following description, value ranges, terms indicating relationships between elements such as "parallel" and "vertical", and terms indicating the shapes of elements such as "quadrilateral" do not have the meanings in the strict sense only, but include essentially equivalent value ranges and meanings, for example deviations of about a few percent.

In the following description, a "transmission path" refers to a transfer path including, for example, a line for propagating radio frequency transmission signals, an electrode directly connected to the line, and a terminal directly connected to the line or the electrode. A "reception path" refers to a transfer path including, for example, a line for propagating radio frequency reception signals, an electrode directly connected to the line, and a terminal directly connected to the line or the electrode.

In addition, in the following description, the expression "A and B are connected" applies not only when A and B are physically connected, but also when A and B are electrically connected.

[1.1 Circuit Configuration of Radio Frequency Module 1 and Communication Device 5]

FIG. 1 illustrates a circuit configuration of radio frequency module 1 and communication device 5 according to one embodiment. As illustrated in the figure, communication device 5 includes radio frequency module 1, antenna 2, radio frequency (RF) signal processing circuit (RF integrated circuit (IC)) 3, and baseband signal processing circuit (BBIC) 4. In this exemplary configuration, communication device 5 is a multi-band transceiver. As used in this specification the term "module", as used with "radio frequency module", or "RF front-end module" should be construed as circuitry (programmable, as well as discrete) and associated circuit components, such as circuit boards, RF shielding, etc.

RFIC 3 is an RF signal processing circuit that processes radio frequency signals that are transmitted or received by antenna 2. Specifically, RFIC 3 processes reception signals input via reception paths of radio frequency module 1 by down-conversion, for example, and outputs resultant reception signals to BBIC 4. Furthermore, as used herein the terms "circuit" or "circuitry" means one or more circuits, including discrete circuit(s) as well as circuit board(s) and combinations thereof.

BBIC 4 is a circuit that performs data processing using a signal of a frequency lower than that of radio frequency signals transferred by radio frequency module 1. The signal processed by BBIC 4 is used as, for example, an image signal for image display, or an audio signal for reproduction by a loudspeaker.

RFIC 3 functions as a controller that controls connection of switch 50 included in radio frequency module 1 based on communication bands (frequency bands) used. Specifically, RFIC 3 switches the connection of switch 50 using a control signal. Note that the controller may be provided outside RFIC 3; for example, in radio frequency module 1.

Antenna 2 is connected to antenna connection terminal 100 of radio frequency module 1, receives a radio frequency signal from outside, and outputs the received radio frequency signal to radio frequency module 1.

Note that antenna 2 and BBIC 4 are optional elements in communication device 5 according to the present embodiment.

Next, a detailed configuration of radio frequency module 1 will be described.

As illustrated in FIG. 1, radio frequency module 1 includes antenna connection terminal 100, reception output terminals 110 and 120, filters 10 and 20, matching circuits 12 and 22, low noise amplifiers 14 and 24, and switch 50.

Antenna connection terminal 100 is connected to antenna 2.

Low noise amplifier 14 amplifies reception signals of communication band A with low noise, and outputs the amplified signals to reception output terminal 110. Low noise amplifier 24 amplifies reception signals of communication band B with low noise, and outputs the amplified signals to reception output terminal 120.

Low noise amplifiers 14 and 24 are each configured with, for example, a field-effect transistor (FET) or a heterojunction bipolar transistor (HBT) including, for instance, a Si-based complementary metal oxide semiconductor (CMOS) or GaAs.

Filter 10 has input terminal 101 and output terminal 102, is disposed on reception path AR that connects antenna connection terminal 100 and reception output terminal 110, and passes reception signals in the reception band of communication band A among reception signals input via antenna connection terminal 100. Input terminal 101 (a first input/output terminal) is connected to switch 50, whereas output terminal 102 (a second input/output terminal) is connected to matching circuit 12.

Filter 20 has input terminal 151 and output terminal 152, is disposed on reception path BR that connects antenna connection terminal 100 and reception output terminal 120, and passes reception signals in the reception band of communication band B among reception signals input via antenna connection terminal 100. Input terminal 151 is connected to switch 50, whereas output terminal 152 is connected to matching circuit 22.

Note that filters 10 and 20 may each be, but are not limited to, an acoustic wave filter that uses surface acoustic waves (SAWs), an acoustic wave filter that uses bulk acoustic waves (BAWs), an inductor-capacitor (LC) resonance filter, or a dielectric filter, for example.

Matching circuit 12 is connected to output terminal 102 and the input terminal of low noise amplifier 14, and matches the impedances of filter 10 and low noise amplifier 14. Matching circuit 12 includes at least one of an inductor or a capacitor.

Matching circuit 22 is connected to output terminal 152 and the input terminal of low noise amplifier 24, and matches the impedances of filter 20 and low noise amplifier 24. Matching circuit 22 includes at least one of an inductor or a capacitor.

Switch 50 is an example of a first switch, and is connected to antenna connection terminal 100. Switch 50: switches connection and disconnection between antenna connection terminal 100 and filter 10; and switches connection and disconnection between antenna connection terminal 100 and filter 20. Note that switch 50 may be a multiple-connection switch circuit capable of simultaneously establishing the connection between antenna connection terminal 100 and filter 10 and the connection between antenna connection terminal 100 and filter 20.

Note that an additional impedance matching circuit, filter, switch, etc. may be disposed on each signal path included in radio frequency module 1.

In the above configuration of radio frequency module 1, switch 50, filter 10, matching circuit 12, and low noise amplifier 14 are included in a first receiver circuit that transfers reception signals of communication band A from antenna 2 via antenna connection terminal 100. Also, switch 50, filter 20, matching circuit 22, and low noise amplifier 24 are included in a second receiver circuit that transfers reception signals of communication band B from antenna 2 via antenna connection terminal 100.

Note that, in addition to the first receiver circuit and the second receiver circuit, radio frequency module 1 may include a first transmitter circuit that transfers transmission signals of communication band A and a second transmitter circuit that transfers transmission signals of communication band B. The first transmitter circuit includes, for example, a filter that passes transmission signals of communication band A, a power amplifier that amplifies transmission signals of communication band A, and a matching circuit that matches the impedances of the filter and the power amplifier.

The second transmitter circuit includes, for example, a filter that passes transmission signals of communication band B, a power amplifier that amplifies transmission signals of communication band B, and a matching circuit that matches the impedances of the filter and the power amplifier.

At least one of low noise amplifier 14, low noise amplifier 24, or switch 50 may be formed in a semiconductor integrated circuit (IC). The semiconductor IC includes a complementary metal oxide semiconductor (CMOS), for example. Specifically, the semiconductor IC is formed by a silicon on insulator (SOI) process. This way, the semiconductor IC can be manufactured at low cost. Note that the semiconductor IC may include at least one of GaAs, SiGe, or GaN. Accordingly, radio frequency signals having high-quality amplification properties and noise properties can be output.

Note that matching circuits 12 and 22 are optional elements in radio frequency module 1 according to the present embodiment. Further, a matching circuit may be disposed between switch 50 and filter 10 in radio frequency module 1 according to the present embodiment. Also, a matching circuit may be disposed between switch 50 and filter 20.

Here, in the case of mounting each circuit component of the radio frequency module on a single module board as a small front-end circuit, the distances between the circuit components decrease, with the result that the signal passing properties of the radio frequency module may deteriorate due to mutual interference between the circuit components.

In contrast, radio frequency module 1 according to the present embodiment has a configuration which can reduce deterioration of the signal passing properties of radio frequency module 1 even in the case of mounting the circuit components on a double-sided mounting module board at high density. Hereinafter, a mounting configuration of radio frequency module 1 will be described.

[1.2 Arrangement of Circuit Components of Radio Frequency Module 1A According to Working Example 1]

Figure 2A:
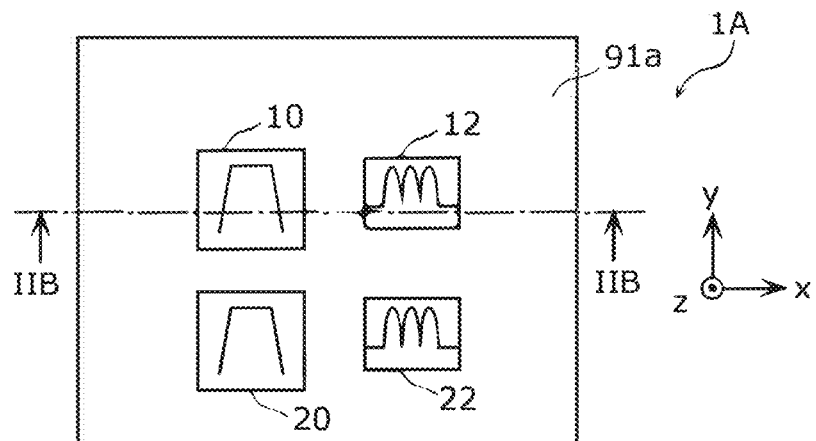
FIG. 2A is a schematic diagram illustrating a plan view configuration of a layout of circuit components of a radio frequency module (or RF front-end circuitry) according to Working Example 1.
Figure 2B:
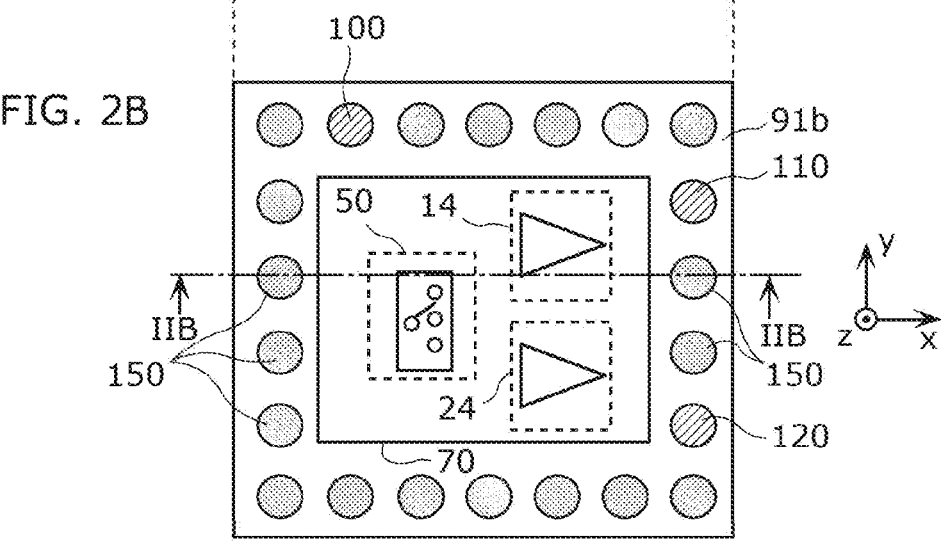
FIG. 2B is a schematic drawing illustrating a perspective view of the layout of circuit components of the radio frequency module according to Working Example 1.
Figure 2C:
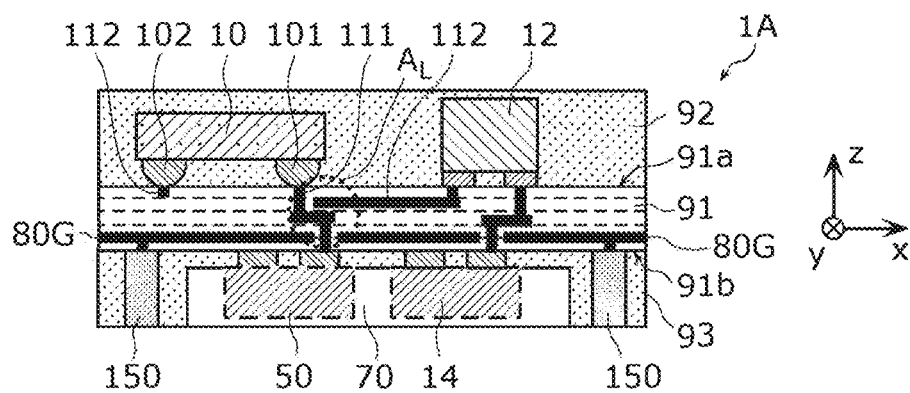
FIG. 2C shows a schematic diagram illustrating a cross-sectional configuration of the radio frequency module according to Working Example 1.
Figure 2D:
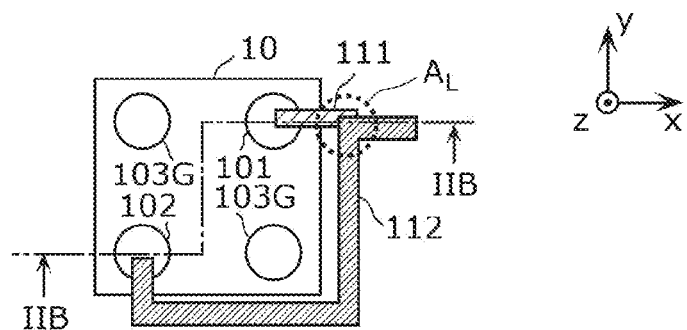
FIG. 2D shows a perspective view of a layout of filter connection lines of the radio frequency module according to Working Example 1.

FIG. 2A is a schematic diagram illustrating a plan view configuration of radio frequency module 1A according to Working Example 1. FIG. 2B is a schematic drawing illustrating a perspective view configuration of radio frequency module 1A according to Working Example 1. FIG. 2C shows a schematic diagram illustrating a cross-sectional configuration of radio frequency module 1A according to Working Example 1, and FIG. 2D shows a perspective view of a layout diagram of filter connection lines. Specifically, FIG. 2C is a cross-sectional view taken at line IIB-IIB in FIG. 2A, and FIG. 2D is a perspective view of each terminal of filter 10 and lines connected to the terminals when viewed from the z-axis positive side. Note that FIG. 2A illustrates the layout of circuit components when, out of principal surfaces 91a and 91b located on opposite sides of module board 91, principal surface 91a is viewed from the z-axis positive side. FIG. 2B is a perspective view of the layout of circuit components when principal surface 91b is viewed from the z-axis positive side.

Radio frequency module 1A according to Working Example 1 is to specifically show an arrangement of circuit components included in radio frequency module 1 according to an embodiment illustrated in FIG. 1.

As illustrated in FIGS. 2A-2D, radio frequency module 1A according to the present working example includes module board 91, resin components 92 and 93, and external-connection terminal 150 in addition to the circuit configuration illustrated in FIG. 1.

Module board 91 is a board which includes principal surface 91a (a first principal surface) and principal surface 91b (a second principal surface) on opposite sides of module board 91, and on which circuit components are mounted. Examples of the board used for module board 91 include a low temperature co-fired ceramics (LTCC) board including a plurality of dielectric layers laminated, a high temperature co-fired ceramics (HTCC) board, a component-embedded board, a board having a redistribution layer (RDL), and a printed circuit board.

Resin component 92 is disposed on principal surface 91a of module board 91, and covers circuit components and principal surface 91a of module board 91. Resin component 92 has a function to ensure the reliability of the circuit components, such as the mechanical strength and moisture resistance. Resin component 93 is disposed on principal surface 91b of module board 91, and covers circuit components and principal surface 91b of module board 91. Resin component 93 has a function to ensure the reliability of the circuit components, such as the mechanical strength and moisture resistance. Note that resin components 92 and 93 are optional elements in the radio frequency module according to the present disclosure.

External-connection terminal 150 is disposed on principal surface 91b. Via a plurality of external-connection terminals 150, radio frequency module 1A exchanges electric signals with a motherboard that is disposed on the z-axis negative side of radio frequency module 1A. Some of external-connection terminals 150 are set to the ground potential of the motherboard. One of external-connection terminals 150 is antenna connection terminal 100. Further, one of external-connection terminals 150 is reception output terminal 110, and another is reception output terminal 120.

As illustrated in FIG. 2A-2D, in radio frequency module 1A according to the present working example, filters 10 and 20 and matching circuits 12 and 22 are surface-mounted on principal surface 91a of module board 91. Low noise amplifiers 14 and 24 and switch 50 are surface-mounted on principal surface 91b of module board 91. In the present working example, matching circuits 12 and 22 are second circuit components, and switch 50 is a first circuit component.

As illustrated in FIG. 1, input terminal 101 of filter 10 and switch 50 are connected by line 111 (a first line), and output terminal 102 of filter 10 and matching circuit 12 are connected by line 112 (a second line). Input terminal 151 of filter 20 and switch 50 are connected by line 121, and output terminal 152 of filter 20 and matching circuit 22 are connected by line 122.

As illustrated in FIG. 2D, input terminal 101, output terminal 102, and two ground terminals 103G are disposed on a principal surface of filter 10 facing principal surface 91a, for example. Line 111 is connected to input terminal 101, and line 112 is connected to output terminal 102.

Here, as illustrated in FIGS. 2C-2D, in a plan view of module board 91, a footprint of line 111 (the first line) and a footprint of line 112 (the second line) at least partially overlap in region $A_L$ in module board 91.

Since the above configuration creates a portion (region $A_L$) in module board 91 where lines 111 and 112 of filter 10 are in proximity to each other, it is possible to generate electromagnetic coupling between lines 111 and 112. With this, an inductance component or a capacitance component resulting from the electromagnetic coupling is added to filter 10, thus enabling, for example, a shift of an attenuation pole in the passing properties of filter 10. Accordingly, it is possible to improve the passing properties of filter 10, and enhance the signal transfer properties of radio frequency module 1A.

Note that in a plan view of module board 91, line 111 and line 112 may intersect in module board 91. This can reduce variations in the overlapping surface area of lines 111 and 112 in a plan view. It is thus possible to reduce variations in the inductance component or capacitance component that is added as a result of the electromagnetic coupling generated in the intersection, and therefore, the passing properties of filter 10 can be improved to have a high degree of precision.

Note that in radio frequency module 1A according to the present working example, in a plan view of module board 91, a footprint of line 121 and a footprint of line 122 may at least partially overlap in module board 91. With this, an inductance component or a capacitance component resulting from electromagnetic coupling is added to filter 20, thus enabling improvement in the passing properties of filter 20. Accordingly, it is possible to further enhance the signal transfer properties of radio frequency module 1A.

Note that low noise amplifiers 14 and 24 and switch 50 may be included in semiconductor IC 70. With this, semiconductor IC 70 including the low noise amplifiers and switch that can be readily reduced in profile is disposed on principal surface 91b facing the motherboard. Therefore, radio frequency module 1A can be reduced in size and profile as a whole.

Note that it is sufficient so long as semiconductor IC 70 includes at least one of low noise amplifier 14, low noise amplifier 24, or switch 50. Semiconductor IC 70 may include a control circuit that controls at least one of low noise amplifier 14, low noise amplifier 24, or switch 50 using a digital control signal.

Further, since a plurality of external-connection terminals 150 applied as ground electrodes are disposed in the outer periphery of low noise amplifiers 14 and 24 having a significant impact on the reception sensitivity of the receiver circuits, it is possible to reduce deterioration of the reception sensitivity of the receiver circuits.

As illustrated in part FIG. 2C, radio frequency module 1A according to the present working example further includes ground electrode layer 80G in module board 91. Ground electrode layer 80G is a ground electrode pattern formed substantially parallel to principal surfaces 91a and 91b of module board 91. Here, in a plan view of module board 91, ground electrode layer 80G is formed between principal surface 91b and the line portion (region $A_L$) in module board 91 where a footprint of line 111 and a footprint of line 112 overlap.

With this configuration, since noise generated from the circuit components disposed on principal surface 91b can be cut off by ground electrode layer 80G, the electromagnetic coupling generated in the above-described line portion (region $A_L$) can be set to a high degree of precision. When semiconductor IC 70 is disposed on principal surface 91b, since power supply noise and digital noise generated from semiconductor IC 70 can be cut off by ground electrode layer 80G, the electromagnetic coupling generated in the above-described line portion (region $A_L$) can be set to a high degree of precision.

Note that radio frequency module 1A according to the present working example is also applicable to a circuit configuration different from radio frequency module 1 according to an embodiment in that matching circuit 12 is disposed between switch 50 and filter 10 rather than between filter 10 and low noise amplifier 14. In such a configuration, a second switch is disposed between filter 10 and low noise amplifier 14 to switch connection and disconnection between filter 10 and low noise amplifier 14.

In that case, filter 10 and matching circuit 12 are surface-mounted on principal surface 91a of module board 91, whereas low noise amplifier 14 and the second switch are surface-mounted on principal surface 91b of module board 91. Matching circuit 12 is the second circuit component, and the second switch is the first circuit component. Input terminal 101 of filter 10 and matching circuit 12 are connected by line 111 (the second line), whereas output terminal 102 of filter 10 and the second switch are connected by line 112 (the first line). Here, in a plan view of module board 91, a footprint of line 111 (the second line) and a footprint of line 112 (the first line) at least partially overlap in module board 91.

Even with the above configuration, it is possible to generate electromagnetic coupling between lines 111 and 112. With this, an inductance component or a capacitance component resulting from the electromagnetic coupling is added to filter 10, thus enabling improvement in the passing properties of filter 10.

Figure 2E:
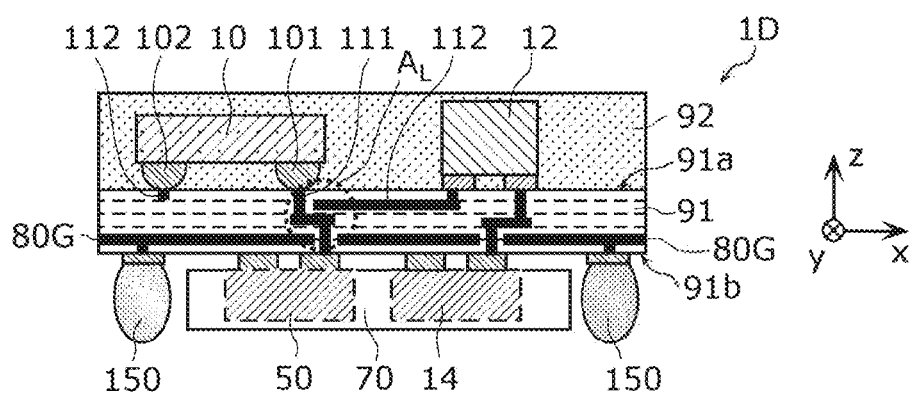
FIG. 2E is a schematic diagram illustrating a cross-sectional configuration of a radio frequency module according to a variation.

Note that external-connection terminals 150 may be columnar electrodes penetrating through resin component 93 in the z-axis direction as illustrated in FIGS. 2A-2D, or may be bump electrodes 160 formed on principal surface 91b as in radio frequency module 1D illustrated in FIG. 2E. As illustrated in FIG. 2E, resin component 93 is not disposed on principal surface 91b when external-connection terminals 150 are bump electrodes 160.

In radio frequency module 1A according to the present working example, external-connection terminals 150 may be disposed on principal surface 91a.

[1.3 Arrangement of Circuit Components of Radio Frequency Module 1B According to Working Example 2]

Figure 3:
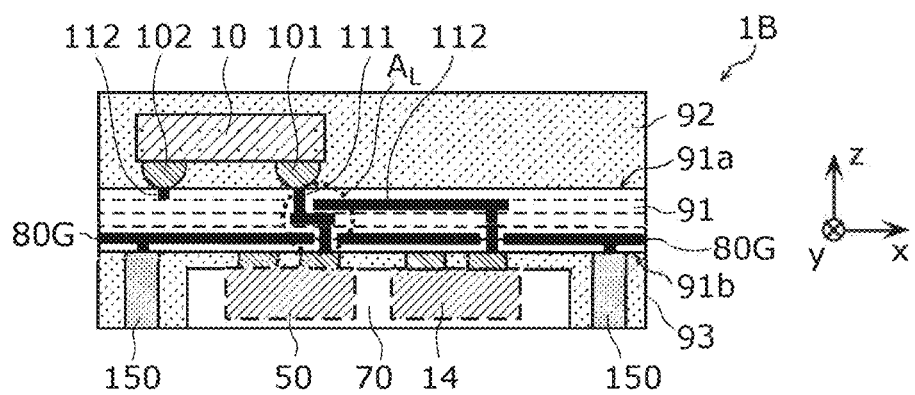
FIG. 3 is a schematic diagram illustrating a cross-sectional configuration of a radio frequency module according to Working Example 2.

FIG. 3 is a schematic diagram illustrating a cross-sectional view configuration of radio frequency module 1B according to Working Example 2. Radio frequency module 1B according to Working Example 2 is to specifically show an arrangement of circuit components in the case where matching circuit 12 is not included in radio frequency module 1 illustrated in FIG. 1. Hereinafter, radio frequency module 1B according to the present working example will be described, focusing on the constituent elements different from radio frequency module 1A according to Working Example 1 and omitting the description of the constituent elements identical to radio frequency module 1A.

Radio frequency module 1B according to the present working example is applied to a circuit configuration different from radio frequency module 1 illustrated in FIG. 1 in that matching circuit 12 is not disposed between filter 10 and low noise amplifier 14, and that output terminal 102 is directly connected to the input terminal of low noise amplifier 14.

In radio frequency module 1B according to the present working example, filters 10 and 20 are surface-mounted on principal surface 91a of module board 91. Low noise amplifiers 14 and 24 and switch 50 are surface-mounted on principal surface 91b of module board 91. In the present working example, low noise amplifier 14 is the second circuit component, and switch 50 is the first circuit component. That is to say, switch 50 (the first circuit component) and low noise amplifier 14 (the second circuit component) are disposed on principal surface 91b.

Input terminal 101 of filter 10 and switch 50 are connected by line 111 (the first line), whereas output terminal 102 of filter 10 and the input terminal of low noise amplifier 14 are connected by line 112 (the second line).

Here, as illustrated in FIG. 3, in a plan view of module board 91, a footprint of line 111 (the first line) and a footprint of line 112 (the second line) at least partially overlap in region $A_L$ in module board 91.

Since the above configuration creates a portion (region $A_L$) in module board 91 where lines 111 and 112 of filter 10 are in proximity to each other, it is possible to generate electromagnetic coupling between lines 111 and 112. With this, an inductance component or a capacitance component resulting from the electromagnetic coupling is added to filter 10, thus enabling improvement in the passing properties of filter 10. Accordingly, it is possible to enhance the signal transfer properties of radio frequency module 1B.

As illustrated in FIG. 3, radio frequency module 1B according to the present working example further includes ground electrode layer 80G in module board 91. Here, in a plan view of module board 91, ground electrode layer 80G is formed between principal surface 91b and the line portion (region $A_L$) in module board 91 where a footprint of line 111 and a footprint of line 112 overlap.

With this configuration, since noise generated from the circuit components disposed on principal surface 91b can be cut off by ground electrode layer 80G, the electromagnetic coupling generated in the above-described line portion can be set to a high degree of precision.

Switch 50 connected to line 111 and low noise amplifier 14 connected to line 112 are both disposed on principal surface 91b. That is to say, since switch 50 and low noise amplifier 14 that are prone to give noise to the line portion (region $A_L$) are both disposed across ground electrode layer 80G from the line portion (region $A_L$), it is possible to precisely cut off noise generated from switch 50 and low noise amplifier 14.

In radio frequency module 1B according to the present working example, external-connection terminals 150 may be disposed on principal surface 91a.

While radio frequency module 1 has been described to include filter 10, radio frequency module 6 is another implementation and includes duplexer 30.

[2.1 Circuit Configuration of Radio Frequency Module 6 and Communication Device 7]

Figure 4:
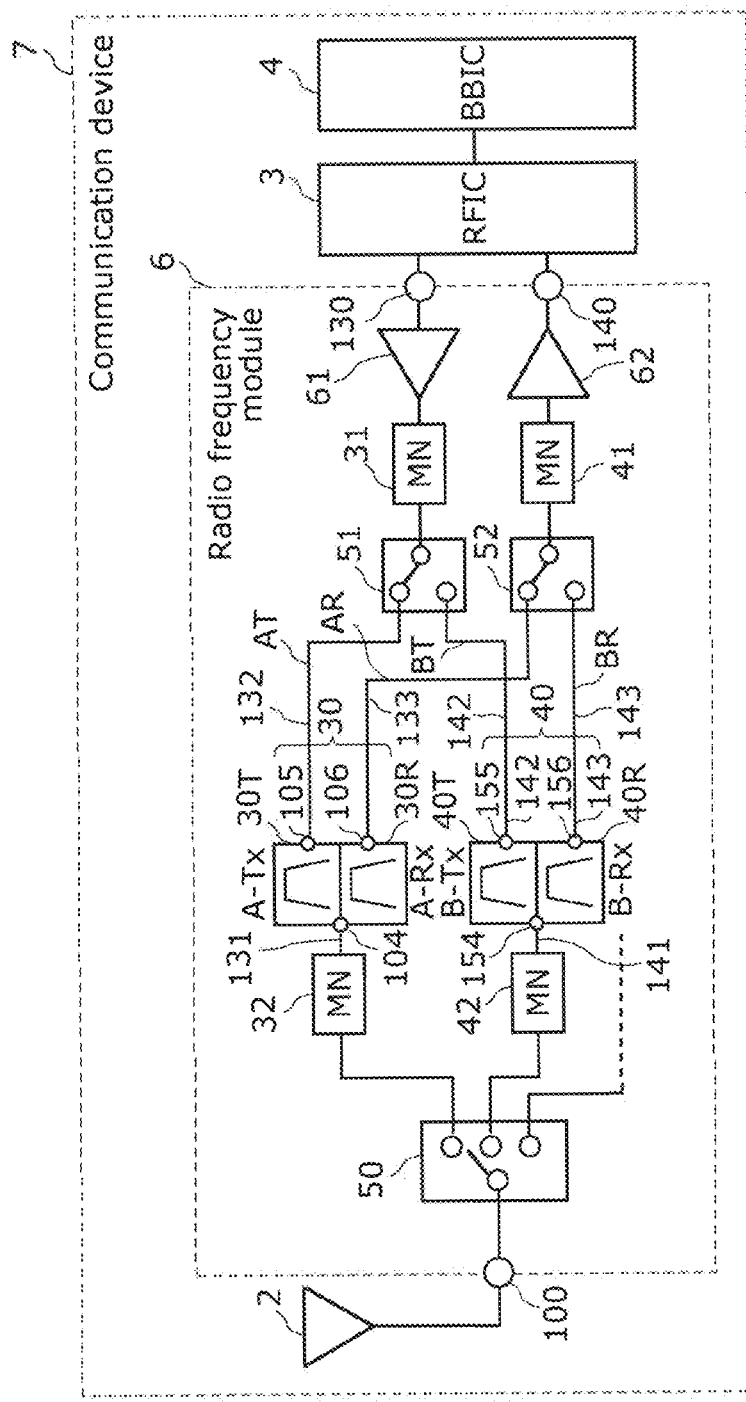
FIG. 4 illustrates a circuit configuration of a radio frequency module and a communication device according to another embodiment.

FIG. 4 illustrates a circuit configuration of radio frequency module 6 and communication device 7 according to another embodiment. As illustrated in the figure, communication device 7 includes radio frequency module 6, antenna 2, RFIC 3, and BBIC 4. Communication device 7 according to the present embodiment is different from communication device 5 in configuration of radio frequency module 6. Hereinafter, communication device 7 according to the present embodiment will be described, focusing on the aspects different from communication device 5 and omitting the description of the aspects identical to communication device 5.

RFIC 3 is an RF signal processing circuit that processes radio frequency signals that are transmitted or received by antenna 2. Specifically, RFIC 3 processes reception signals input via reception paths of radio frequency module 6 by down-conversion, for example, and outputs resultant reception signals to BBIC 4. RFIC 3 also outputs, to transmission paths of radio frequency module 6, radio frequency transmission signals processed based on a signal input from BBIC 4.

RFIC 3 functions as a controller that controls connections of switches 50, 51, and 52 included in radio frequency module 6 based on communication bands (frequency bands) used. Specifically, RFIC 3 switches the connections of switches 50, 51, and 52 using control signals. Note that the controller may be provided outside RFIC 3; for example, in radio frequency module 6.

RFIC 3 also functions as a controller that controls the gain of power amplifier 61 included in radio frequency module 6. Specifically, RFIC 3 outputs digital control signals which are in conformity with mobile industry processor interface (MIPI) etc. to radio frequency module 6. RFIC 3 also outputs, to radio frequency module 6, direct-current voltage signal VDC for power supply voltage Vcc and bias voltage Vbias which are to be supplied to power amplifier 61. Note that radio frequency module 6 may include a power amplifier (PA) control circuit. The PA control circuit may adjust the gain of power amplifier 61 using the digital control signal and the direct-current voltage signal received from RFIC 3.

Note that antenna 2 and BBIC 4 are optional elements in communication device 7 according to the present embodiment.

Next, a detailed configuration of radio frequency module 6 will be described.

As illustrated in FIG. 4, radio frequency module 6 includes antenna connection terminal 100, transmission input terminal 130, reception output terminal 140, duplexers 30 and 40, matching circuits 31, 32, 41, and 42, power amplifier 61, low noise amplifier 62, and switches 50, 51, and 52.

Antenna connection terminal 100 is connected to antenna 2.

Power amplifier 61 amplifies transmission signals of communication band A and communication band B received via transmission input terminal 130.

Low noise amplifier 62 amplifies reception signals of communication band A and communication band B with low noise, and outputs the amplified signals to reception output terminal 140.

Note that power amplifier 61 and low noise amplifier 62 are each configured with, for example, an FET or an HBT including, for instance, a Si-based CMOS or GaAs.

Transmission filter 30T is disposed on transmission path AT that connects power amplifier 61 and antenna connection terminal 100, and passes transmission signals in the transmission band of communication band A among the transmission signals amplified by power amplifier 61.

Reception filter 30R is disposed on reception path AR that connects low noise amplifier 62 and antenna connection terminal 100, and passes reception signals in the reception band of communication band A among the reception signals received via antenna connection terminal 100.

Transmission filter 30T and reception filter 30R constitute duplexer 30 whose passband is communication band A. Duplexer 30 includes common terminal 104, transmission input terminal 105, and reception output terminal 106. Common terminal 104 is connected to matching circuit 32, transmission input terminal 105 is connected to a first selection terminal of switch 51, and reception output terminal 106 is connected to a first selection terminal of switch 52.

Transmission filter 40T is disposed on transmission path BT that connects power amplifier 61 and antenna connection terminal 100, and passes transmission signals in the transmission band of communication band B among the transmission signals amplified by power amplifier 61.

Reception filter 40R is disposed on reception path BR that connects low noise amplifier 62 and antenna connection terminal 100, and passes reception signals in the reception band of communication band B among the reception signals received via antenna connection terminal 100.

Transmission filter 40T and reception filter 40R constitute duplexer 40 whose passband is communication band B. Duplexer 40 includes common terminal 154, transmission input terminal 155, and reception output terminal 156. Common terminal 154 is connected to matching circuit 42, transmission input terminal 155 is connected to a second selection terminal of switch 51, and reception output terminal 156 is connected to a second selection terminal of switch 52.

Note that transmission filters 30T and 40T and reception filters 30R and 40R may each be, but are not limited to, an acoustic wave filter that uses SAWs, an acoustic wave filter that uses BAWs, an LC resonance filter, or a dielectric filter, for example.

Matching circuit 32 is connected to switch 50 and common terminal 104, and matches the impedances of switch 50 and duplexer 30. Matching circuit 42 is connected to switch 50 and common terminal 154, and matches the impedances of switch 50 and duplexer 40.

Matching circuit 31 is connected to switch 51 and power amplifier 61, and matches the impedances of switch 51 and power amplifier 61. Matching circuit 41 is connected to switch 52 and low noise amplifier 62, and matches the impedances of switch 52 and low noise amplifier 62. Each of matching circuits 31, 32, 41, and 42 includes at least one of an inductor or a capacitor.

Switch 50 is an example of a first switch, and is connected to antenna connection terminal 100. Switch 50: switches connection and disconnection between antenna connection terminal 100 and duplexer 30; and switches connection and disconnection between antenna connection terminal 100 and duplexer 40. Note that switch 50 may be a multiple-connection switch circuit capable of simultaneously establishing the connection between antenna connection terminal 100 and duplexer 30 and the connection between antenna connection terminal 100 and duplexer 40.

Switch 51 is an example of a second switch, and is disposed between transmission filters 30T and 40T and matching circuit 31. Switch 51 switches between connection of transmission filter 30T with power amplifier 61 and connection of transmission filter 40T with power amplifier 61. Switch 52 is an example of the second switch, and is disposed between reception filters 30R and 40R and matching circuit 41. Switch 52 switches between connection of reception filter 30R with low noise amplifier 62 and connection of reception filter 40R with low noise amplifier 62.

Note that an additional impedance matching circuit, filter, switch, etc. may be disposed on each signal path included in radio frequency module 6.

At least one of low noise amplifier 62, switch 50, switch 51, or switch 52 may be formed in a semiconductor IC. The semiconductor IC includes a CMOS, for example. Specifically, the semiconductor IC is formed by an SOI process. This way, the semiconductor IC can be manufactured at low cost. Note that the semiconductor IC may include at least one of GaAs, SiGe, or GaN. Accordingly, radio frequency signals having high-quality amplification properties and noise properties can be output.

Note that matching circuits 32 and 42 are optional elements in radio frequency module 6 according to the present embodiment.

In radio frequency module 6 according to the present embodiment, transmission filter 30T and reception filter 30R constitute duplexer 30 that transfers transmission signals and reception signals by frequency division duplexing (FDD). Duplexer 30, however, may transfer the transmission signals and the reception signals by time division duplexing (TDD). In that case, a switch for switching between transmission and reception is disposed in at least one of the preceding stage or the subsequent stage of transmission filter 30T and reception filter 30R. Transmission filter 40T and reception filter 40R may also transfer transmission signals and reception signals by TDD.

[2.2 Arrangement of Circuit Components of Radio Frequency Module 1C According to Working Example 3]

Figure 5A:
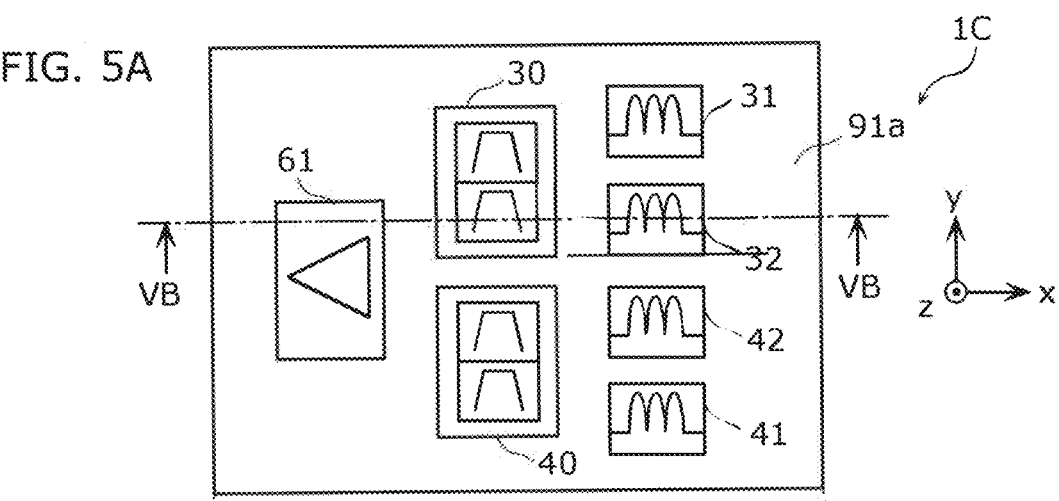
FIG. 5A is a schematic diagram illustrating a plan view configuration of a radio frequency module according to Working Example 3.
Figure 5B:
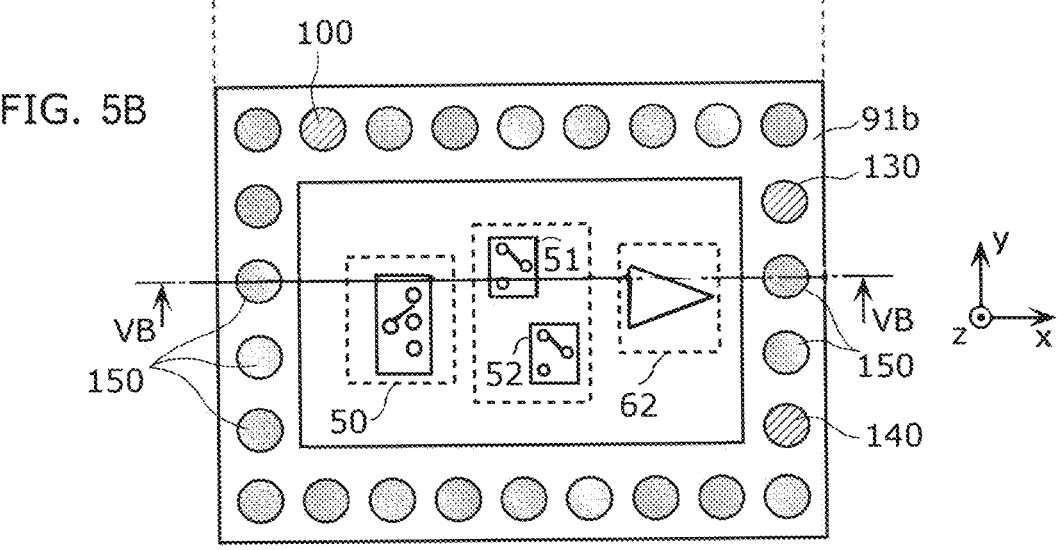
FIG. 5B is a schematic diagram illustrating a perspective view of a layout of circuit components of the radio frequency module according to Working Example 3.
Figure 5C:
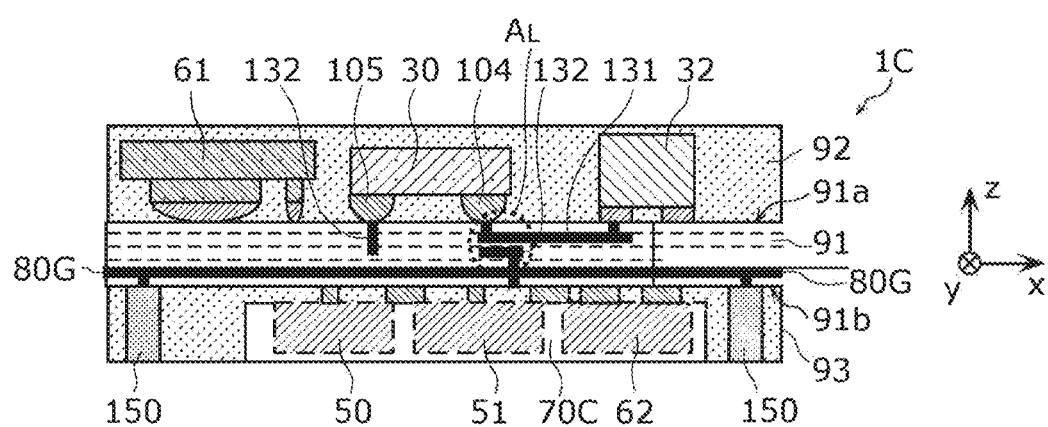
FIG. 5C shows a schematic diagram illustrating a cross-sectional configuration of the radio frequency module according to Working Example 3.
Figure 5D:
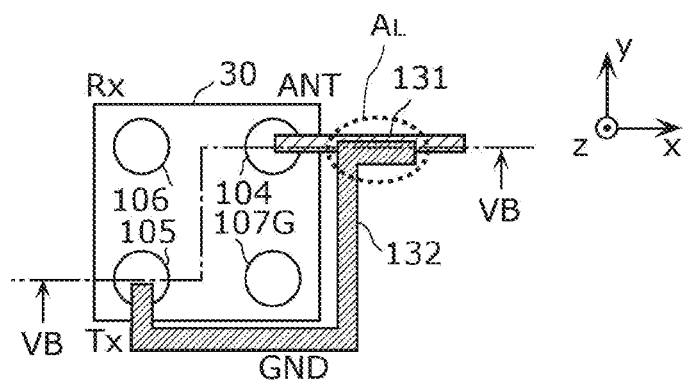
FIG. 5D shows a perspective view of a layout of filter connection lines of the radio frequency module according to Working Example 3.

FIG. 5A is a schematic diagram illustrating a plan view configuration of radio frequency module 1C according to Working Example 3. FIG. 5B is a schematic diagram illustrating a perspective view of radio frequency module 1C according to Working Example 3. FIG. 5C shows a schematic diagram illustrating a cross-sectional configuration of radio frequency module 1C according to Working Example 3, and FIG. 5D shows a layout of filter connection lines. Specifically, FIG. 5C is a cross-sectional view taken at line VB-VB in FIG. 5A, and FIG. 5D is a perspective view of each terminal of duplexer 30 and lines connected to the terminals when viewed from the z-axis positive side. Note that FIG. 5A illustrates the layout of circuit components when, out of principal surfaces 91a and 91b located on opposite sides of module board 91, principal surface 91a is viewed from the z-axis positive side. FIG. 5B is a perspective view of the layout of circuit components when principal surface 91b is viewed from the z-axis positive side.

Radio frequency module 1C according to Working Example 3 is to specifically show an arrangement of circuit components included in radio frequency module 6 illustrated in FIG. 4.

Radio frequency module 1C according to Working Example 3 is different from radio frequency module 1A according to Working Example 1 in that duplexers 30 and 40 are disposed instead of filters 10 and 20. Hereinafter, radio frequency module 1C according to the present working example will be described, focusing on the constituent elements different from radio frequency module 1A according to Working Example 1 and omitting the description of the constituent elements identical to radio frequency module 1A.

As illustrated in FIGS. 5A-5D, radio frequency module 1C according to the present working example includes module board 91, resin components 92 and 93, and external-connection terminal 150 in addition to the circuit configuration illustrated in FIG. 4.

Module board 91 is a board which includes principal surface 91a (a first principal surface) and principal surface 91b (a second principal surface) on opposite sides of module board 91, and on which circuit components are mounted. Examples of the board used for module board 91 include an LTCC board including a plurality of dielectric layers laminated, an HTCC board, a component-embedded board, a board having an RDL, and a printed circuit board.

External-connection terminal 150 is disposed on principal surface 91b. Via a plurality of external-connection terminals 150, radio frequency module 1C exchanges electric signals with a motherboard that is disposed on the z-axis negative side of radio frequency module 1C. Some of external-connection terminals 150 are set to the ground potential of the motherboard. One of external-connection terminals 150 is antenna connection terminal 100. Further, one of external-connection terminals 150 is transmission input terminal 130, and another is reception output terminal 140.

As illustrated in FIGS. 5A-5D, in radio frequency module 1C according to the present working example, duplexers 30 and 40, power amplifier 61, and matching circuits 31, 32, 41, and 42 are surface-mounted on principal surface 91a of module board 91. Low noise amplifier 62 and switches 50, 51, and 52 are surface-mounted on principal surface 91b of module board 91. In the present working example, matching circuits 32 and 42 are second circuit components, and switches 51 and 52 are first circuit components.

As illustrated in FIG. 4, common terminal 104 of duplexer 30 and matching circuit 32 are connected by line 131 (a second line), transmission input terminal 105 of duplexer 30 and switch 51 are connected by line 132 (a first line), and reception output terminal 106 of duplexer 30 and switch 52 are connected by line 133 (the first line). Also, common terminal 154 of duplexer 40 and matching circuit 42 are connected by line 141 (the second line), transmission input terminal 155 of duplexer 40 and switch 51 are connected by line 142 (the first line), and reception output terminal 156 of duplexer 40 and switch 52 are connected by line 143 (the first line).

As illustrated in FIG. 5D, common terminal 104, transmission input terminal 105, reception output terminal 106, and ground terminal 107G are disposed on a principal surface of duplexer 30 facing principal surface 91a, for example. Line 131 is connected to common terminal 104, and line 132 is connected to transmission input terminal 105.

Here, as illustrated in FIGS. 5C-5D, in a plan view of module board 91, a footprint of line 131 (the second line) and a footprint of line 132 (the first line) at least partially overlap in region $A_L$ in module board 91.

Since the above configuration creates a portion (region $A_L$) in module board 91 where lines 131 and 132 of duplexer 30 are in proximity to each other, it is possible to generate electromagnetic coupling between lines 131 and 132. With this, an inductance component or a capacitance component resulting from the electromagnetic coupling is added to transmission filter 30T included in duplexer 30, thus enabling, for example, a shift of an attenuation pole in the passing properties of transmission filter 30T. Accordingly, it is possible to improve the passing properties of transmission filter 30T, and enhance the signal transfer properties of radio frequency module 1C.

Note that in a plan view of module board 91, line 131 and line 132 may intersect in module board 91. This can reduce variations in the overlapping surface area of lines 131 and 132 in a plan view. It is thus possible to reduce variations in the inductance component or capacitance component that is added as a result of the electromagnetic coupling generated in the intersection, and therefore, the passing properties of transmission filter 30T can be improved to have a high degree of precision.

Note that in radio frequency module 1C according to the present working example, a footprint of line 141 and a footprint of line 142 may at least partially overlap in module board 91 in the plan view. With this, an inductance component or a capacitance component resulting from the electromagnetic coupling is added to transmission filter 40T included in duplexer 40, and it is therefore possible to improve the passing properties of transmission filter 40T. Accordingly, it is possible to further enhance the signal transfer properties of radio frequency module 1C.

Note that low noise amplifier 62 and switches 50, 51, and 52 may be included in semiconductor IC 70C. With this, semiconductor IC 70C including the low noise amplifier and switches that can be readily reduced in profile is disposed on principal surface 91b facing the motherboard. Therefore, radio frequency module 1C can be reduced in size and profile as a whole.

Note that it is sufficient so long as semiconductor IC 70C includes at least one of low noise amplifier 62, switch 50, switch 51, or switch 52. Semiconductor IC 70C may include a control circuit that controls at least one of low noise amplifier 62, switch 50, switch 51, or switch 52 using a digital control signal. Further, semiconductor IC 70C may include a control circuit that controls power amplifier 61 using a digital control signal.

Since a plurality of external-connection terminals 150 applied as ground electrodes are disposed in the outer periphery of low noise amplifier 62 having a significant impact on the reception sensitivity of the receiver circuits, it is possible to reduce deterioration of the reception sensitivity of the receiver circuits.

As illustrated in FIG. 5C, radio frequency module 1C according to the present working example further includes ground electrode layer 80G in module board 91. Ground electrode layer 80G is an electrode pattern formed substantially parallel to principal surfaces 91a and 91b of module board 91. Here, in a plan view of module board 91, ground electrode layer 80G is formed between principal surface 91b and the line portion (region $A_L$) in module board 91 where a footprint of line 131 and a footprint of line 132 overlap.

With this configuration, since noise generated from the circuit components disposed on principal surface 91b can be cut off by ground electrode layer 80G, the electromagnetic coupling generated in the above-described line portion (region $A_L$) can be set to a high degree of precision. When semiconductor IC 70C is disposed on principal surface 91b, since power supply noise and digital noise generated from semiconductor IC 70C can be cut off by ground electrode layer 80G, the electromagnetic coupling generated in the above-described line portion (region $A_L$) can be set to a high degree of precision.

Note that radio frequency module 1C according to the present working example is also applicable to a circuit configuration different from radio frequency module 6 in that matching circuits 32 and 42 are not included.

In that case, duplexers 30 and 40, power amplifier 61, and matching circuits 31 and 41 are surface-mounted on principal surface 91a of module board 91, whereas low noise amplifier 62 and switches 50, 51, and 52 are surface-mounted on principal surface 91b of module board 91. Switch 50 is the second circuit component, and switches 51 and 52 are first circuit components. That is to say, switch 50 (the second circuit component) and switches 51 and 52 (the first circuit components) are disposed on principal surface 91b. Here, in a plan view of module board 91, a footprint of line 131 (the second line) and a footprint of line 132 (the first line) at least partially overlap in region $A_L$ in module board 91.

Even in that case, it is possible to create a portion (region $A_L$) in module board 91 where lines 131 and 132 of duplexer 30 are in proximity to each other, and thus, electromagnetic coupling can be generated between lines 131 and 132. Accordingly, it is possible to improve the passing properties of transmission filter 30T, and enhance the signal transfer properties of radio frequency module 1C.

In radio frequency module 1C according to the present working example, the combination of two connection lines whose footprints at least partially overlap in module board 91 is not limited to lines 131 and 132.

Figure 6A:
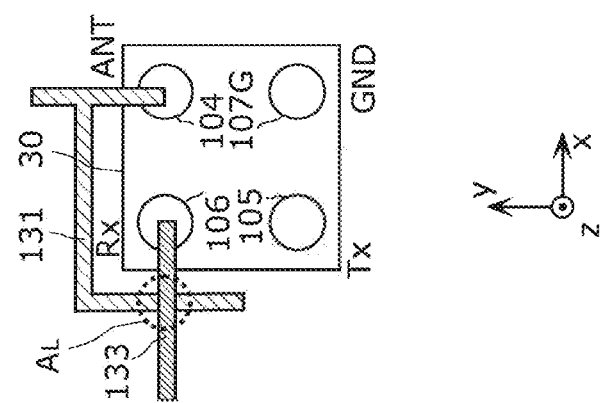
FIGS. 6A-6C illustrate examples of other planar layouts of filter connection lines according to Working Example 3.
Figure 6B:
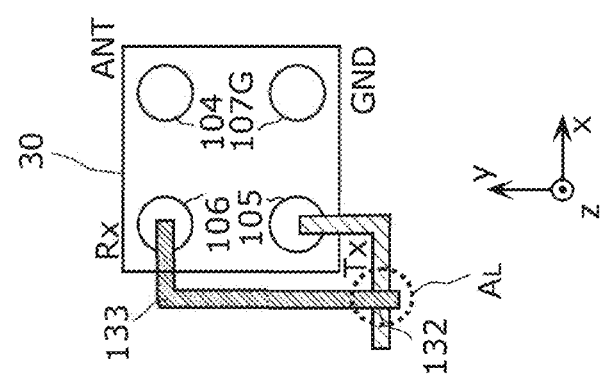
Figure 6C:
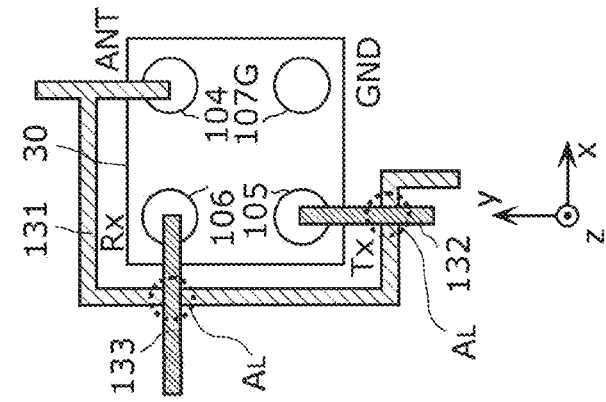

FIGS. 6A-6C illustrate examples of other planar layouts of connection lines of duplexer 30 according to Working Example 3.

In FIG. 6A, in a plan view of module board 91, a footprint of line 131 (the second line) and a footprint of line 133 (the first line) overlap in region $A_L$ in module board 91. Since the above configuration creates a portion (region $A_L$) in module board 91 where lines 131 and 133 of duplexer 30 are in proximity to each other, it is possible to generate electromagnetic coupling between lines 131 and 133. With this, an inductance component or a capacitance component resulting from the electromagnetic coupling is added to reception filter 30R included in duplexer 30, thus enabling, for example, a shift of an attenuation pole in the passing properties of reception filter 30R. Accordingly, it is possible to improve the passing properties of reception filter 30R, and enhance the signal transfer properties of radio frequency module 1C.

In FIG. 6B, in a plan view of module board 91, a footprint of line 132 (the second line) and a footprint of line 133 (the first line) overlap in region $A_L$ in module board 91. Since the above configuration creates a portion (region $A_L$) in module board 91 where lines 132 and 133 of duplexer 30 are in proximity to each other, it is possible to generate electromagnetic coupling between lines 132 and 133. With this, an inductance component or a capacitance component resulting from the electromagnetic coupling is added between transmission filter 30T and reception filter 30R constituting duplexer 30, thus enabling, for example, a shift of an attenuation pole in the isolation properties of transmission filter 30T and reception filter 30R. Accordingly, it is possible to improve the isolation properties of transmission filter 30T and reception filter 30R, and enhance the signal transfer properties of radio frequency module 1C.

In FIG. 6C, in a plan view of module board 91, a footprint of line 131 (the second line) and a footprint of line 132 (the first line) overlap in region $A_L$ in module board 91, and a footprint of line 131 (the second line) and a footprint of line 133 (the first line) overlap in another region $A_L$ in module board 91. With this configuration, an inductance component or a capacitance component resulting from the electromagnetic coupling is added to each of transmission filter 30T and reception filter 30R constituting duplexer 30, thus enabling, for example, a shift of an attenuation pole in the passing properties of transmission filter 30T and reception filter 30R. Accordingly, it is possible to improve the passing properties of transmission filter 30T and reception filter 30R, and enhance the signal transfer properties of radio frequency module 1C.

Advantageous Effects Etc

Radio frequency module 1 includes: module board 91 including principal surface 91a and principal surface 91b on opposite sides of module board 91; filter 10 including input terminal 101 and output terminal 102; switch 50 (a first circuit component); and matching circuit 12 (a second circuit component). In radio frequency module 1, filter 10 is disposed on principal surface 91a, switch 50 is disposed on principal surface 91b, and in a plan view of module board 91, a footprint of line 111 (a first line) and a footprint of line 112 (a second line) at least partially overlap in module board 91. Here, line 111 is a line that connects input terminal 101 and switch 50, and line 112 is a line that connects output terminal 102 and matching circuit 12. Configurations of radio frequency modules and communication devices of the double-sided mounting type in accordance with the present application reduce deterioration of the signal passing properties.

Since the above configuration creates a portion (region $A_L$) in module board 91 where lines 111 and 112 of filter 10 are in proximity to each other, it is possible to generate electromagnetic coupling between lines 111 and 112. With this, an inductance component or a capacitance component resulting from the electromagnetic coupling is added to filter 10, and it is therefore possible to improve the passing properties of filter 10, and enhance the signal transfer properties of radio frequency module 1.

In radio frequency module 1, input terminal 101 of filter 10 is connected to switch 50 (the first circuit component) disposed on principal surface 91b, output terminal 102 of filter 10 is connected to the input terminal of low noise amplifier 14 (the second circuit component) disposed on principal surface 91b, and in a plan view of module board 91, a footprint of line 111 (the first line) that connects input terminal 101 and switch 50 and a footprint of line 112 (the second line) that connects output terminal 102 and low noise amplifier 14 may at least partially overlap in module board 91.

Radio frequency module 6 includes: module board 91 including principal surface 91a and principal surface 91b on opposite sides of module board 91; duplexer 30 including common terminal 104, transmission input terminal 105, and reception output terminal 106; switch 51 (a first circuit component); and matching circuit 32 (a second circuit component). In radio frequency module 6, duplexer 30 is disposed on principal surface 91a, switch 51 is disposed on principal surface 91b, and in a plan view of module board 91, a footprint of line 132 (a first line) and a footprint of line 131 (a second line) at least partially overlap in module board 91. Here, line 132 is a line that connects transmission input terminal 105 and switch 51, and line 131 is a line that connects common terminal 104 and matching circuit 32.

Since the above configuration creates a portion (region $A_L$) in module board 91 where lines 131 and 132 of duplexer 30 are in proximity to each other, it is possible to generate electromagnetic coupling between lines 131 and 132. With this, an inductance component or a capacitance component resulting from the electromagnetic coupling is added to transmission filter 30T included in duplexer 30, and it is therefore possible to improve the passing properties of transmission filter 30T, and enhance the signal transfer properties of radio frequency module 1C.

In radio frequency module 6, common terminal 104 of duplexer 30 may be connected to switch 50 (the second circuit component) disposed on principal surface 91b, transmission input terminal 105 of duplexer 30 may be connected to switch 51 (the first circuit component) disposed on principal surface 91b, and in a plan view of module board 91, a footprint of line 131 (the second line) that connects common terminal 104 and switch 50 and a footprint of line 132 (the first line) that connects transmission input terminal 105 and switch 51 may at least partially overlap in module board 91.

Radio frequency module 1 and radio frequency module 6 may further include ground electrode layer 80G between principal surface 91b and a line portion where the footprint of the first line and the footprint of the second line overlap in module board 91 in the plan view.

With this configuration, since noise generated from the circuit components disposed on principal surface 91b can be cut off by ground electrode layer 80G, the electromagnetic coupling generated in the above-described line portion can be set to a high degree of precision.

Radio frequency modules 1 and 6 may further include external-connection terminal 150 disposed on principal surface 91b, and the first circuit component and the second circuit component may be included in semiconductor integrated circuit (IC) 70 (or 70C) disposed on principal surface 91b.

This configuration makes it possible to reduce the profile and size of radio frequency modules 1 and 6.

In radio frequency modules 1 and 6, in the plan view, the first line and the second line may intersect in module board 91.

This configuration makes it possible to reduce variations in the inductance component or capacitance component added as a result of electromagnetic coupling. Accordingly, the signal transfer properties of radio frequency modules 1 and 6 can be improved to have a high degree of precision.

In radio frequency modules 1 and 6, the first circuit component may be one of switch 50 (a first switch), switch 51 (a second switch), and switch 52 (a second switch), and the second circuit component may be one of an inductor and a capacitor.

In radio frequency modules 1 and 6, the first circuit component may be switch 50 (a first switch), and the second circuit component may be one of switch 51 (a second switch) and switch 52 (a second switch).

In radio frequency module 6, switch 50 (a first switch), switch 51 (a second switch), switch 52 (a second switch), and low noise amplifier 62 may be included in semiconductor IC 70C.

Semiconductor IC 70C may further include a control circuit configured to control switches 50, 51, and 52 and low noise amplifier 62 using a digital control signal.

Communication device 5 (or 7) includes: radio frequency integrated circuit (RFIC) 3 configured to process radio frequency signals that are transmitted or received by antenna 2; and radio frequency module 1 (or 6) configured to transfer the radio frequency signals between antenna 2 and RFIC 3.

This configuration makes it possible to provide communication device 5 (or 7) of the double-sided mounting type that reduces deterioration of the signal passing properties.

Although a radio frequency module and a communication device according to embodiments of the present disclosure have been described based on embodiments, working examples, and variations, the radio frequency module and the communication device according to the present disclosure are not limited to the above embodiments, working examples, and variations. The present disclosure also encompasses: other embodiments implemented by arbitrarily combining constituent elements in the above embodiments, working examples, and variations; variations achieved through various modifications to the above embodiments, working examples, and variations that are conceivable to a person skilled in the art without departing from the essence of the present disclosure; and various apparatuses that include the above radio frequency module and communication device.

For example, in the radio frequency module and the communication device according to the above embodiments, working examples, and variations, circuit components and lines, for instance, may be interposed between circuit components and paths that connect signal paths illustrated in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable for use in a communication apparatus (e.g., a mobile phone) as a radio frequency module disposed in a multiband-compatible front-end portion.

The invention claimed is:

1. A radio frequency (RF) module, comprising:
   a board including a first principal surface and a second principal surface on opposite sides of the board;
   a filter including a first terminal and a second terminal;
   a first circuit; and
   a second circuit, wherein
   the filter is disposed on the first principal surface,
   the first circuit is disposed on the second principal surface,
   in a plan view of the board, a first footprint of a first line and a second footprint of a second line at least partially overlap in the board,
   the first line extends through the board and connects the first terminal and the first circuit, and
   the second line connects the second terminal and the second circuit.

2. The RF module according to claim 1, further comprising:
   a ground electrode layer between the second principal surface and a line portion where the first footprint of the first line and the second footprint of the second line overlap in the board in the plan view.

3. The RF module according to claim 1, wherein the second circuit is disposed on the second principal surface.

4. The RF module according to claim 3, further comprising:
   an external-connection terminal disposed on the second principal surface, wherein
   the first circuit and the second circuit are included in a semiconductor integrated circuit (IC) disposed on the second principal surface.

5. The RF module according to claim 3, further comprising:
   an antenna connection terminal; and
   an amplifier, wherein
   the first circuit is a first switch configured to switch connection and disconnection between the antenna connection terminal and the first terminal, and
   the second circuit is a second switch configured to switch connection and disconnection between the amplifier and the second terminal.

6. The RF module according to claim 1, wherein in the plan view, the first line and the second line intersect in the board.

7. The RF module according to claim 1, further comprising:
   an antenna connection terminal; and
   an amplifier, wherein
   the first circuit is one of (i) a first switch configured to switch connection and disconnection between the antenna connection terminal and the first terminal, and (ii) a second switch configured to switch connection and disconnection between the amplifier and the first terminal, and
   the second circuit is one of an inductor and a capacitor.

8. A communication device, comprising:
   an antenna;
   an RF signal processing circuit configured to process RF signals that are transmitted or received by the antenna; and
   the RF module according to claim 1 configured to transfer the RF signals between the antenna and the RF signal processing circuit.

9. The RF module according to claim 1, wherein the second line extends through the board.

10. The RF module according to claim 1, wherein the first line extends along a first direction, and the second line extends along a second direction orthogonal to the first direction.

11. A radio frequency (RF) module, comprising:
a board including a first principal surface and a second principal surface on opposite sides of the board;
a duplexer including a common terminal, a transmission input terminal, and a reception output terminal;
a first circuit; and
a second circuit, wherein
the duplexer is disposed on the first principal surface,
the first circuit is disposed on the second principal surface,
in a plan view of the board, a first footprint of a first line and a second footprint of a second line at least partially overlap in the board,
the first line extends through the board and connects the first circuit and a first terminal,
the first terminal is one of the common terminal, the transmission input terminal, and the reception output terminal,
the second line connects the second circuit and a second terminal, and
the second terminal is a different one of the common terminal, the transmission input terminal, and the reception output terminal.

12. The RF module according to claim 11, further comprising:
a ground electrode layer between the second principal surface and a line portion where the first footprint of the first line and the second footprint of the second line overlap in the board in the plan view.

13. The RF module according to claim 11, wherein the second circuit is disposed on the second principal surface.

14. The RF module according to claim 13, further comprising:
an external-connection terminal disposed on the second principal surface, wherein
the first circuit and the second circuit are included in a semiconductor integrated circuit (IC) disposed on the second principal surface.

15. The RF module according to claim 14, further comprising:
an antenna connection terminal; and
an amplifier, wherein
the first circuit is a first switch configured to switch connection and disconnection between the antenna connection terminal and the first terminal,
the second circuit is a second switch configured to switch connection and disconnection between the amplifier and the second terminal, and
the first switch, the second switch, and the amplifier are included in the semiconductor IC.

16. The RF module according to claim 15, wherein the semiconductor IC further includes a control circuit configured to control at least one of the first switch, the second switch, or the amplifier using a digital control signal.

17. The RF module according to claim 13, further comprising:
an antenna connection terminal; and
an amplifier, wherein
the first circuit is a first switch configured to switch connection and disconnection between the antenna connection terminal and the first terminal, and
the second circuit is a second switch configured to switch connection and disconnection between the amplifier and the second terminal.

18. The RF module according to claim 11, wherein in the plan view, the first line and the second line intersect in the board.

19. The RF module according to claim 11, further comprising:
an antenna connection terminal; and
an amplifier, wherein
the first circuit is one of (i) a first switch configured to switch connection and disconnection between the antenna connection terminal and the first terminal, and (ii) a second switch configured to switch connection and disconnection between the amplifier and the first terminal, and
the second circuit is one of an inductor and a capacitor.

20. A communication device, comprising:
an antenna;
an RF signal processing circuit configured to process RF signals that are transmitted or received by the antenna; and
the RF module according to claim 11 configured to transfer the RF signals between the antenna and the RF signal processing circuit.

* * * * *